3 Sheets—Sheet 1.

F. WEGMANN.

ROLLER GRINDING MILL.

No. 10,579. Reissued Apr. 7, 1885.

Witnesses:
Jas. P. DuHamel
Walter S. Dodge

Inventor:
Friedrich Wegmann,
by Dodger Son,
Attys.

N. PETERS Photo-Lithographer, Washington, D. C.

3 Sheets—Sheet 2.

F. WEGMANN.

ROLLER GRINDING MILL.

No. 10,579. Reissued Apr. 7, 1885.

*Witnesses:*

Jas. F. DeHamel.
Walter S. Dodge

*Inventor:*

Friedrich Wegmann,
by Dodger & Son,
Attys.

N. PETERS. Photo-Lithographer, Washington, D. C.

F. WEGMANN.

ROLLER GRINDING MILL.

No. 10,579. Reissued Apr. 7, 1885.

Witnesses:
Jas. F. DuHamel.
Walter S. Dodge

Inventor:
Friedrich Wegmann,
by Dodger & Son,
Attys.

N. PETERS. Photo-Lithographer, Washington, D. C.

UNITED STATES PATENT OFFICE.

FRIEDRICH WEGMANN, OF ZURICH, SWITZERLAND.

ROLLER GRINDING-MILL.

SPECIFICATION forming part of Reissued Letters Patent No. 10,579, dated April 7, 188

Original No. 276,104, dated April 17, 1883. Application for reissue filed October 24, 1884. Patented in Germany June 19, 1879, No. 9,926, and December 4, 1879, No. 10,304, and in England June 23, 1879, No. 2,513.

*To all whom it may concern:*

Be it known that I, FRIEDRICH WEGMANN, a citizen of Switzerland, residing at Zurich, in the Canton of Zurich and Republic of Switzerland, have invented certain new and useful Improvements in Roller Grinding-Mills, of which the following is a specification, reference being had therein to the accompanying drawings, forming a part of the same.

My invention relates to roller-mills for reducing grain and other substances, the improvements having reference more particularly to the feed-controlling mechanism, whereby the feed is stopped simultaneously with the separation of the rolls, whether said rolls continue to rotate or not.

Figure 1:
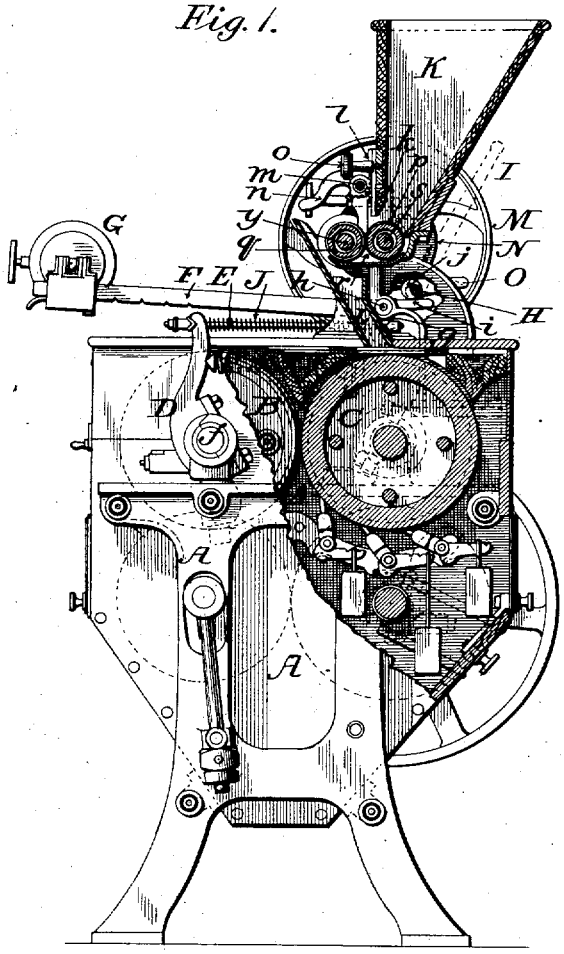
Figure 2:
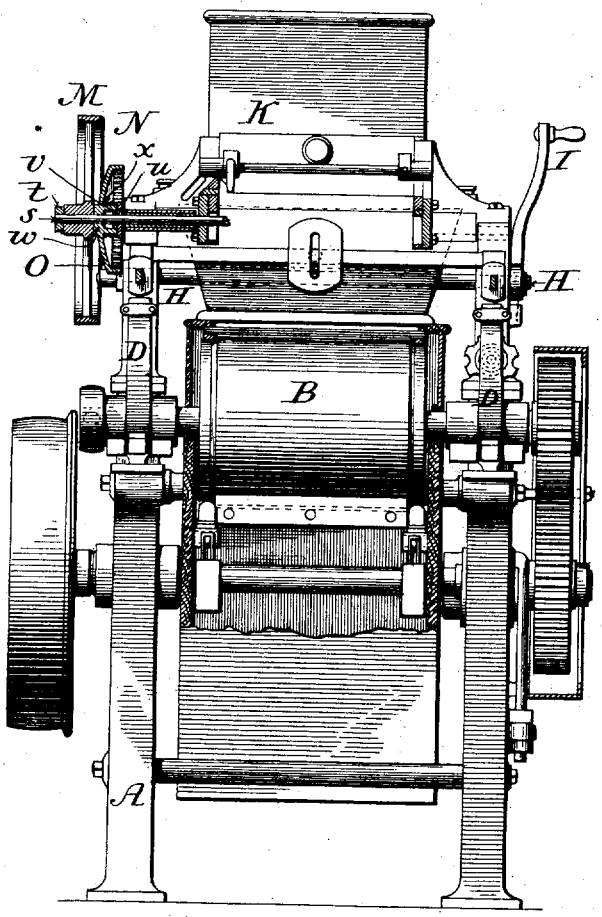
Figure 3:
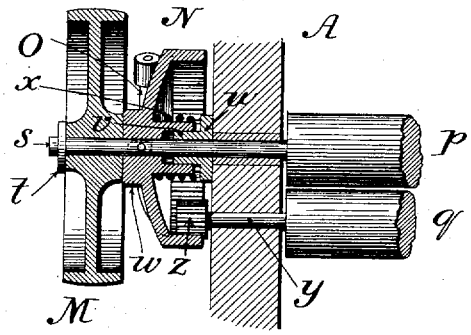
Figure 4:
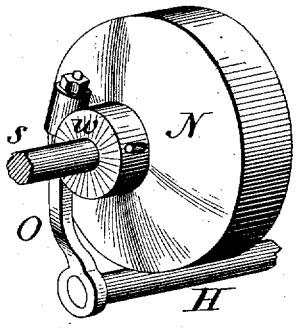
Figure 5:
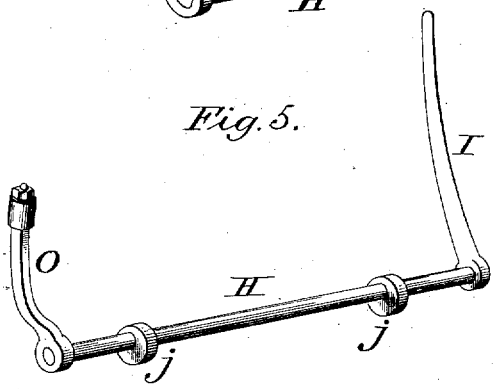

In the accompanying drawings, Figure 1 represents a side elevation of my improved mill, partially in section; Fig. 2, an end elevation, likewise partially in section; Figs. 3, 4, and 5, views illustrating details of feed mechanism.

A represents the frame of the mill or machine, which may be of any usual or approved construction affording the requisite rigidity and strength; and B C, the grinding-rolls, arranged in pairs, one or more pairs being mounted in each frame. The rolls may be of porcelain, chilled iron, steel, or any other material commonly used for the purpose, and one roll of each pair is made adjustable to and from its companion, which latter is preferably carried in fixed boxes or bearings.

D represents an upright swinging arm mounted upon a pivot, the ends of which are journaled in frame A, and the arm-sustaining portion of which is set eccentrically with reference to the ends, so that as the whole is rotated the position of the pivot *a* is changed, raised, lowered, or moved forward or backward, according to the direction and extent of rotation. One end of the pivot-bolt is threaded to screw into the frame and retain the pivot in place, and a jam-nut is employed to prevent the accidental turning of the pivot after it is properly adjusted. Two such arms are used for the adjustable roll—one at each end of the roll, as more plainly seen in Fig. 2—the boxes or bearings *f* for the ends of the roller shaft or axle being bolted to the arms D, as shown in Fig. 1. The upper ends of arms D are each drawn inward, or in the direction of the stationary roll, by means of a draw-rod, E, one end of which is attached to the upper end of the arm, while the opposite end is attached to a short arm, *g*, of a lever, F, pivoted to the frame A or to the hopper-frame, and provided with a sliding or adjustable weight, G, which can be moved along the lever to any desired distance from its pivot *h*, and thus made to draw the roll B toward roll C with whatever force may be necessary.

The levers F at both sides of the machine are formed with a second short arm or extension, *i*, beyond the pivot *h*, and these arms extend beneath and rest against eccentrics or cams *j*, formed or secured upon a cross shaft or rod, H, having at one or both ends a hand-lever, I, by which the shaft may be turned or rocked. When the rolls are in working position, the cams or eccentrics are raised up, allowing the weights G to depress the levers F, and thereby causing the draw-rods E to draw upon the arms D, and thus hold them up to working position. When, however, it is desired to spread the rolls apart for any purpose—as, for instance, to prevent injury thereto when running empty—the lever I is moved so as to turn down the cams or eccentrics, which then bear upon and depress the short arms *i*, and consequently elevate the weighted ends of levers F, at the same time, of course, causing the depending arms *g* to swing back and relieve the rod E of strain from weight G. In order to spread the rolls apart with certainty when the pressure of the weights G is removed, each draw-rod E is furnished with a strong spiral spring, J, arranged as shown in Fig. 1; or, instead of this, the spring may be arranged in any common way for the purpose.

The feed-controlling mechanism of the mill is illustrated in Figs. 1 and 2, and certain details thereof are more fully shown in Figs. 3, 4, and 5.

K represents the feed-hopper, provided with a regulating-gate, *k*, having a toothed rack, *l*, on its outer face, in which a pinion, *m*, carried by a hand piece or lever, *n*, engages, as shown, so that by raising or lowering the hand-piece the gate will be adjusted as required, a binding or clamping screw, *o*, being provided to secure the gate at the desired adjustment. At the bottom of the hopper is placed a grooved or corrugated feed-roll, *p*, and in front of this, and upon the same horizontal plane, substantially, is arranged a second roll, *q*, having a smooth surface, and traveling quite close to the surface of roll *p*, a trough or bottom, *r*, being extended from the rear side of the hopper to the front of roll *q*, beneath the two rolls, to prevent the grain, middlings, or other material from falling before it reaches the chute or secondary hopper L, by which it is conducted to the rolls B C. The roll *p* is furnished with a shaft, *s*, which is carried out beyond the side of the frame A, and furnished with a loose band-wheel, M, which is prevented by a collar, *t*, from passing off the end of the shaft.

*u* represents a hub or boss rigidly secured upon shaft *s*, and provided with one or more ribs or feathers, *v*, which project from its outer face along the shaft *s*, and serve to guide the hub or boss of an internally-toothed gear-wheel, N, which is thus free to slide longitudinally along the shaft, but cannot rotate except with and as the shaft rotates. The gear-wheel has a curved or beveled outer face and a hub, *w*, which engages with the hub of wheel M, said hubs being serrated, covered with rubber or leather, or otherwise adapted to lock or bind one upon the other when pressed together with slight force.

*x* indicates a stiff spiral spring encircling the hub of wheel N, and bearing at one end against the inner face of the wheel, and at the other end against the hub or boss *u* of shaft *s*, for the purpose of forcing and holding the wheel N outward toward wheel M, and to cause and maintain the contact and engagement of the hubs of the two wheels, so that as wheel M is rotated by belt or otherwise it is caused to turn wheel N with it, and through said wheel to turn also the shaft *s*, thereby imparting motion to the feed-roll *p*. The device or mechanism may be used in this form or without a second feed-roll, if desired, and with good results. If so used, the hub only of wheel N is required. In practice I prefer, however, to employ the second feed-roll, *q*, the shaft *y* of which is provided with a pinion, *z*, to mesh with the teeth of the internally-toothed wheel N, as shown in Fig. 3. By this arrangement both rolls are caused to turn in the same direction, the roll *q* at a considerably higher speed than roll *p*. Roll *p*, being corrugated and located directly under hopper K, serves to draw the material therefrom, and to carry it to roll *q*, which raises said material in a thin and regular sheet, and carries it over its top and drops it into hopper or chute L, whence it passes to the rolls B C.

It will be seen that under the above construction and arrangement of parts the spring *x* will hold the hub of wheels M N normally in engagement, causing the feed-rolls to turn with the rotation of wheel M. When it is desired to stop the feed without stopping the rolls, the wheel N is pressed inward away from wheel M, which latter then turns loosely and freely upon the shaft *s*, which then remains at rest. Of course if the rolls are stopped the feed necessarily stops, because, as usual, the pulley M is driven by belting from one of the roll-shafts; hence what is required is some means for disconnecting and separating wheels M N and permitting the former to continue its rotation; but it is important that when this is done the rolls B C be at the same instant spread apart or separated to avoid injury of their faces. To secure these several results simultaneously and conveniently I provide the shaft H, which carries the eccentrics *j*, with an arm, O, preferably furnished with an anti-friction sleeve or roller, which arm rides against the curved or beveled outer face of gear-wheel N as the hand-lever I is moved inward to raise the weighted lever F and effect the separation of the rolls, forcing said wheel inward against the pressure of spring *x*, and holding the wheel in such position so long as the hand-lever I remains in said position. The wheel N and feed-rolls consequently cease to rotate, and remain at rest until the hand-lever I is again thrown outward, permitting the weighted levers F to restore the roll B to its working position, the outward movement of said lever also carrying outward the arm O, and permitting the spring *x* to again cause the engagement of the hubs of wheels M and N, and the consequent starting or recommencement of the feed.

I would here remark that the details are not essential, though I have shown and described what I deem the most convenient and satisfactory arrangement; but I believe myself to be the first to provide for simultaneously stopping the feed and spreading the rolls, and therefore, while claiming the mechanism here shown and explained, and believing it to be admirably adapted to carry out my invention in this particular, I do not limit myself to the specific mechanism shown.

The mill is designed to be driven by gearing or belting, as may be preferred.

A guard is placed over the gearing, as shown in Fig. 2.

Having thus described my invention, what I claim is—

1. In a roller-mill, the combination of a roller mounted in stationary bearings, a roller mounted in movable bearings, a feed-regulating device, and mechanism adapted and arranged to simultaneously stop the feed and separate the rolls.

2. In combination with a fixed roll and an adjustable roll, a feed-regulating mechanism, a roll-spreading mechanism, and a lever or hand piece common to both the spreading mechanism and the feed-regulating mechanism, whereby the stopping and starting of the feed may be effected simultaneously with the spreading apart and drawing together of the grinding-rolls, and by a single operation.

3. In a roller-mill, the combination of feed-roll shaft *s*, band-pulley M, arranged to turn loosely upon said shaft, sliding wheel N, and cross-shaft H, provided with arm O, adapted to separate the hubs of band-wheel M and wheel N, as and for the purpose set forth.

4. In a roller-mill, the combination of feed-rolls *p q*, one provided with pinion *z* and the other with internally-toothed gear-wheel N, and loose band-wheel M, the gear-wheel being pressed toward the band-wheel by a spring, *x*, and prevented from turning on its shaft, and the cross-bar H, provided with arm O, as and for the purpose explained.

5. In a roller-mill, the combination of rolls B C, movable and fixed supports for said rolls, respectively, weighted levers F, connected with said movable supports, substantially as shown, shaft *s*, band-pulley M, loosely mounted upon said shaft, wheel N, free to slide but held against rotation upon shaft *s*, the feed-roll and cross-shaft H, provided with the hand-lever I, eccentrics *j*, and arm O.

In testimony whereof I affix my signature in presence of two witnesses.

FRIEDRICH WEGMANN.

Witnesses:
FRIEDRICH SCHUBELIZT,
ROBERT STOLZ.